Patented Apr. 13, 1948

2,439,492

UNITED STATES PATENT OFFICE 2,439,492

BORING APPARATUS

John Gilbert Sharratt and Albert Gordon Sharratt, West Bromwich, England

Application November 23, 1945, Serial No. 630,454
In Great Britain July 26, 1944

4 Claims. (Cl. 77—2)

This invention has for its object to provide a simple and convenient apparatus for boring in position the linings of crank or cam shaft bearings of internal combustion engines, and for other analogous operations.

The invention comprises the combination of a horizontal support adapted to be clamped to an engine body or other work piece, a pair of depending brackets adjustably carried on or near the ends of the said support, a slide on each bracket, a rotatable boring bar carried by the slides, and a screw and nut device in association with one of the slides for imparting axial movements to the boring bar.

Figure 1:
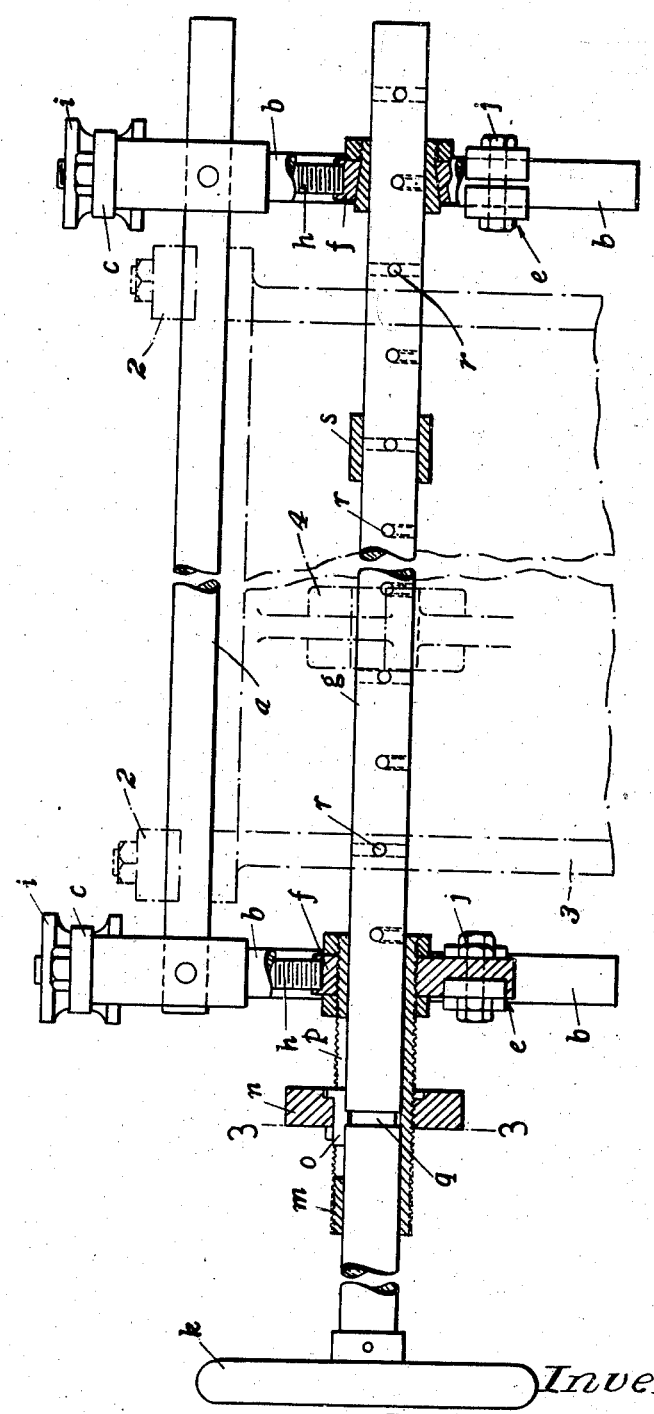
Figure 2:
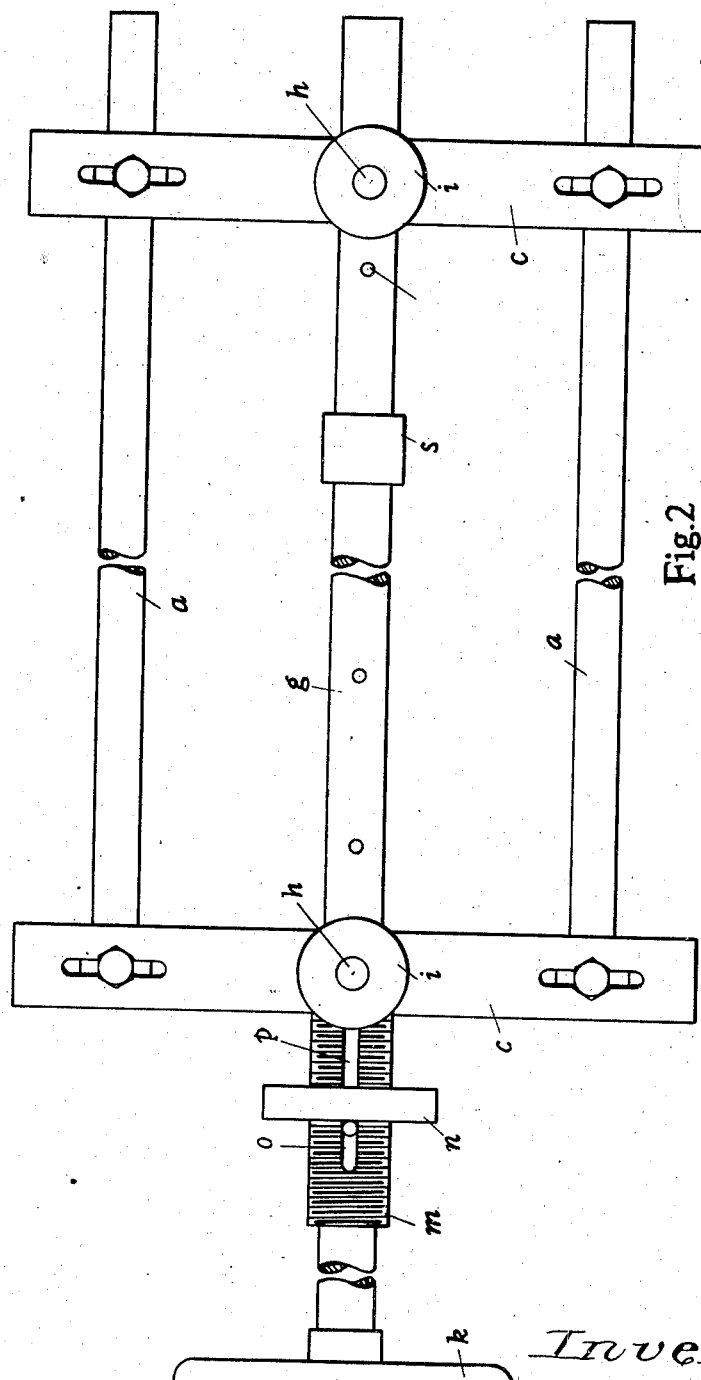
Figure 3:
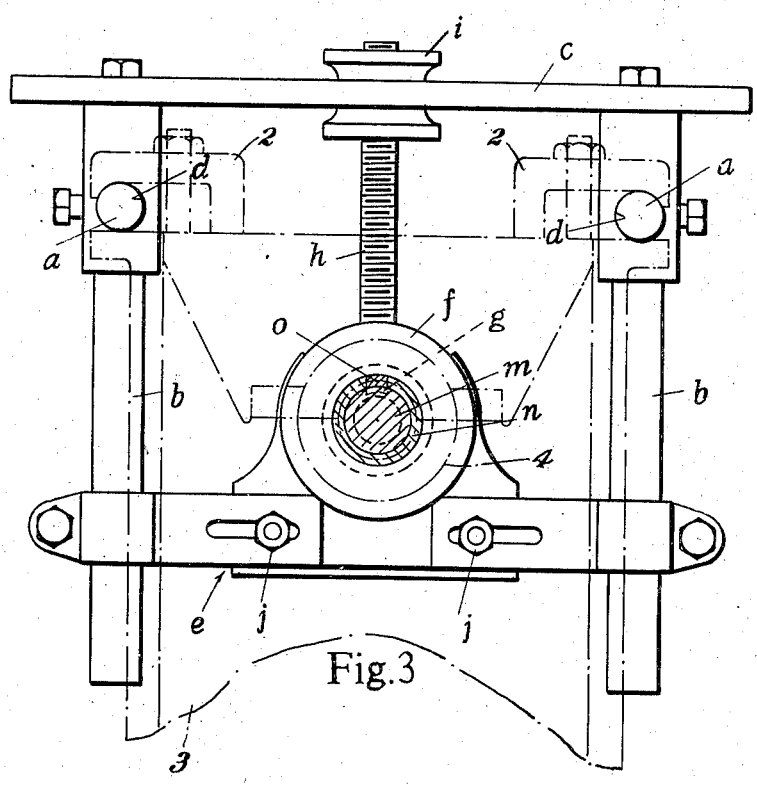

In the accompanying sheets of explanatory drawings:

Figure 1 is a part sectional side view, Figure 2 a plan, and Figure 3 a sectional end view, of apparatus constructed in accordance with the invention for boring in position relined crank or cam shaft bearings of vehicle or like internal combustion engines, Figure 3 being taken on the line 3—3 of Figure 1.

In carrying the invention into effect as shown, we employ a pair of horizontal bars $a$ of circular or other convenient cross section and of appropriate length, these being arranged parallel with each other at a suitable distance apart. These bars $a$ form a horizontal support adapted to be secured by clamps 2 on the open end of an inverted body 3 of an internal combustion engine having relined crank or cam shaft bearings as 4 which require to be bored. At or near each end of the horizontal bars $a$ we mount on and at right angles to them a pair of depending bars $b$ which are slidably adjustable on the horizontal bars, each such pair of depending bars forming a member herein termed a bracket. The bars $b$ of each pair are adjustably tied together by an upper cross bar $c$. Moreover each such bar $b$ is formed near its upper end with a transverse hole $d$ through which passes the corresponding bar $a$ of the support. Also on each of the brackets formed by the bars $b$ we mount an adjustable cross head $e$ (herein termed a slide) which extends horizontally between and is adjustably secured at its ends to the corresponding bracket bars, each such slide being provided with a central bearing $f$ for supporting an adjacent part of a rotatable boring bar $g$. Each slide $e$ is adjustable upwards and downwards on the associated bracket bars $b$ by a screw $h$ attached to the upper part of the bearing $f$ and passing through a rotatable complementary nut $i$ on the upper cross bar $c$ of the bracket. Lateral adjustability of each slide $e$ is effected by making it from two parts which are tied together by the associated bearing $f$, the latter being adjustably secured to the adjacent ends of the slide by bolts $j$.

For rotating the boring bar $g$, a handle $k$ is secured to one of its ends, and for axially moving the boring bar relatively to the work one of the bearings $f$ has secured to it an externally screw threaded sleeve $m$ through which the boring bar passes. On this sleeve is mounted a rotatable nut $n$, which is connected with the boring bar by a key $o$ which extends from the nut through a longitudinal slot $p$ in the sleeve into engagement with a circumferential groove $q$ in the boring bar, so that rotation of the nut can impart the desired axial movement to the boring bar, the periphery of the nut being knurled or otherwise adapted to facilitate manipulation.

Along the boring bar $g$ a number of transverse holes $r$ are formed at suitable distances apart to receive the required cutting tools. Also we provide on the boring bar $g$ two or more pilot collars as $s$ for use in setting up the apparatus.

The mode of using the apparatus above described is as follows. The engine body 3, of which the relined bearings as 4 require to be bored, is inverted and supported on a floor or bed, and the apparatus is placed over the upper open end of the body. To obtain correct alignment of the boring bar $g$, the pilot collars as $s$ are first located in, say, two of the engine bearings as 4 from which the new liners have been temporarily removed, or before the liners are inserted. Having thus determined the position of the bar, the support formed by the bars $a$ is secured in position on the engine body 3 by the clamps 2. Also any necessary adjustments are made to the brackets formed by the depending bars $b$. The pilot collars as $s$ are now moved out of the engine bearings as 4 to unobstructive positions along the bar and the liners are then placed in position. After the cutting tools on the boring bar $g$ have been suitably adjusted, the apparatus is ready for use. The boring operation is effected by rotating the boring bar $g$ by means of the handle $k$, the axial feeding movement of the boring bar being effected by rotation of the nut $n$ on the sleeve $m$. Alternatively the boring bar $g$ may be rotated by mechanical power.

By this invention (which is especially adapted for the requirements of engine repair garages) the reboring of engine crank and cam shaft bearings can be effected in a very convenient and expeditious manner. The invention is not, however, restricted to this particular use as it may be applied to other like purposes. Also subordinate details of construction may be modified to meet different requirements.

Having thus described our invention what we claim as new and desire to secure by Letters Patent is:

1. Boring apparatus comprising in combination a pair of horizontal bars adapted to be clamped to an engine body or other work piece, a pair of depending brackets adjustably carried by the bars in the regions of the ends of the bars, the brackets being formed near their upper ends with holes through which the bars pass, a slide on each bracket, said horizontal bars, brackets and slides forming a substantially rigid frame a rotatable boring bar carried by the slides, and a screw and nut device in association with one of the slides for imparting axial movements to the boring bar.

2. Boring apparatus comprising in combination a pair of horizontal bars adapted to be clamped to an engine body or other work piece, a pair of depending brackets adjustably carried by the bars in the regions of the ends of the bars, each of the brackets comprising a pair of bars depending from the horizontal bars and a cross bar adjustably interconnecting the upper ends of the depending bars, and the brackets being formed near their upper ends with holes through which the horizontal bars pass, a slide in the form of a cross head adjustably supported by each bracket, a rotatable boring bar carried by the cross heads, and adjusting screws connecting the cross heads with the cross bars for adjusting the cross heads along said brackets.

3. Boring apparatus as claimed in claim 2 wherein each adjusting screw engages a rotatable nut on the related cross bar.

4. Boring apparatus as claimed in claim 2, in which each cross head is composed of two parts having their adjacent ends adjustably interconnected through the medium of a bearing whereby the boring bar is supported.

JOHN GILBERT SHARRATT.
ALBERT GORDON SHARRATT.

REFERENCES CITED

The following references are of record in the file of this patent:

UNITED STATES PATENTS

| Number | Name | Date |
|---|---|---|
| 1,611,570 | Wadell | Dec. 21, 1926 |

FOREIGN PATENTS

| Number | Country | Date |
|---|---|---|
| 100,926 | Australia | Feb. 24, 1936 |
| 133,618 | Great Britain | Apr. 9, 1919 |